Figure 1:
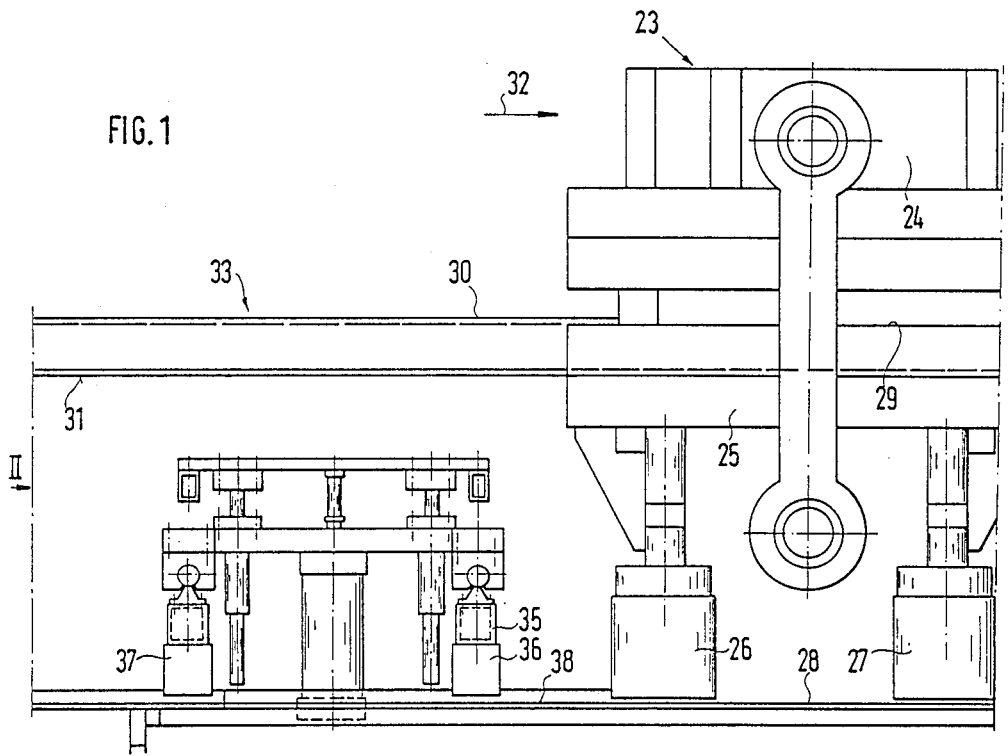

United States Patent [19]
Knape

[11] Patent Number: 4,840,691
[45] Date of Patent: Jun. 20, 1989

[54] PROCESS FOR PRODUCING FORMED AND LABELLED THREE DIMENSIONAL PLASTIC ARTICLES

[75] Inventor: Michael Knape, Marl, Fed. Rep. of Germany

[73] Assignee: Sendvac M. Knape GmbH & Co. Maschinen und Anlagen KG, Recklinghausen, Fed. Rep. of Germany

[21] Appl. No.: 924,622

[22] Filed: Dec. 29, 1986

[30] Foreign Application Priority Data

Oct. 30, 1985 [DE] Fed. Rep. of Germany ....... 3538528
Jun. 27, 1986 [EP] European Pat. Off. ............ 86108804

[51] Int. Cl.$^4$ ............................................. B32B 31/04
[52] U.S. Cl. .................................... 156/245; 156/250; 156/285; 53/453; 53/456; 206/203; 206/204
[58] Field of Search ............... 156/245, 277, 385, 497, 156/522, 250, 285, 547, 548, 559, 578; 264/132, 509, 516; 229/2.5 R; 53/411, 415, 446, 453, 456, 452, 559, 561; 206/203, 204; 493/53, 54, 128, 130, 131, 334, 375

[56] References Cited

U.S. PATENT DOCUMENTS

| | | | |
|---|---|---|---|
| 2,733,381 | 5/1973 | Willette et al. | 156/277 |
| 3,632,252 | 1/1922 | Amberg et al. | 264/509 |
| 4,055,455 | 10/1977 | McDonald et al. | 156/578 |
| 4,235,579 | 11/1980 | Kurz et al. | 264/132 |
| 4,576,278 | 3/1986 | Laiewski et al. | 206/204 |
| 4,632,717 | 12/1986 | Graetz et al. | 156/245 |

*Primary Examiner*—Caleb Weston
*Attorney, Agent, or Firm*—Price, Heneveld, Cooper, DeWitt & Litton

[57] ABSTRACT

In a process for producing labelled and/or printed plastic formed articles, for example plastic trays, from a plastic film sheet, several formed articles being simultaneously shaped in a mat cyclically from the heated plastic film during one cycle, the mats being cooled during at least one intermediate cycle, and the formed articles being obtained from the mat in further subsequent cycles, according to the invention during the intermediate cycle or intermediate cycles the formed articles are provided with the labels and/or are printed by means of a process for printing curved surfaces.

12 Claims, 3 Drawing Sheets

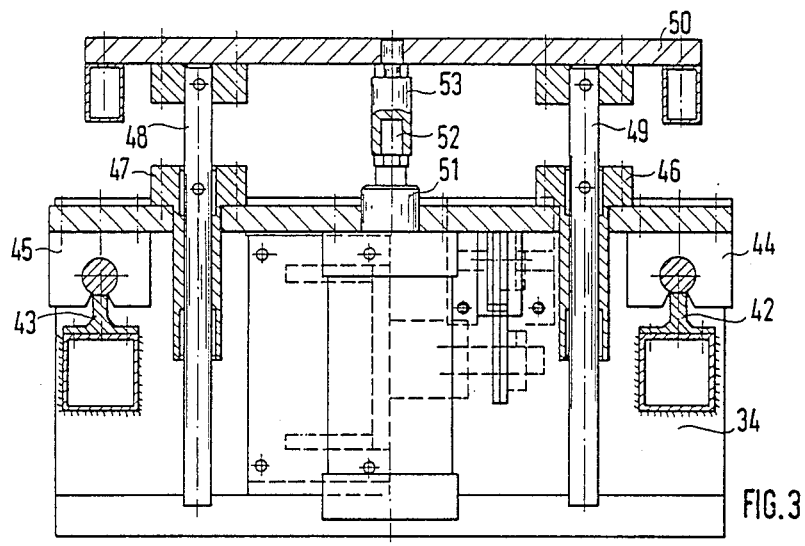
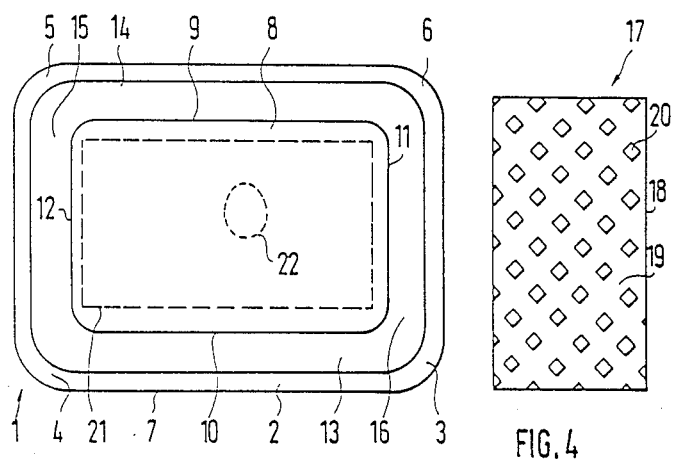

PROCESS FOR PRODUCING FORMED AND LABELLED THREE DIMENSIONAL PLASTIC ARTICLES

DESCRIPTION

The invention relates to a process and an apparatus for producing labelled and/or printed plastic formed articles from a heated sheet of plastic film.

The plastic formed articles produced by the process according to the invention carry a slip or insert which usually performs special functions by virtue of its material and which therefore does not necessarily need to be provided with an inscription. The new process is mainly used to produce plastic trays, in which are packaged solid foodstuffs retained in the tray, for example, by means of a shrink film which is wrapped round the tray containing the packaged article. Plastic trays of this type are often labelled with a combination of cellulose/parchment cut-outs. The cellulose cut-outs have hygroscopic properties. As a result, juice or blood from packaged meat, for example, is absorbed, thereby substantially improving the appearance of the article. In this case, such a paper cut-out consists of several layers and is plane on the side facing the article, but on the opposite adhesive side is usually provided with elevations or depressions which, among other things, increase the absorbing effect. The parchment layer makes it easier to separate the article when it is extracted from the plastic tray and does not leave any residues behind on the article.

In addition to or instead of the labelling, by means of the process according to the invention the plastic formed articles, for example the plastic trays, can be printed on their outside. This can be for advertising imprints or items of information.

The production of the formed plastic articles by the process according to the invention is carried out on a production line and usually from a foamed film or an expanded polystyrene material and generally in a sheet which is drawn off from a roll. In such a production line, the individual process steps are executed by several machine subassemblies which interact in cycles and which simultaneously produce or process several formed articles arranged together over a portion of the length of the sheet, that is to say on so-called mats. In particular, this can be carried out by means of a heating device which follows the above-described film roll and which heats a mat surface on the film sheet which, in the following cycle, passes into a forming device where formed trays, cups or the like are shaped, but which are still joined together in the mat. The following intermediate cycle or intermediate cycles allow for the fact that, according to the process, the formed articles, when they cool, experience dimensional changes which, albeit relatively slight, nevertheless prevent the formed articles from being processed in the intermediate cycle. The intermediate cycle is followed by the stamping out of the formed articles from the mat, this being carried out in a stamping machine. This machine can stamp out a multiplicity of formed articles simultaneously. The formed articles separated thereby are counted, stacked and bagged ready for dispatch.

Characteristics of production lines of this type are extremely high processing speeds and correspondingly large quantities of relatively small and light-weight formed articles which are obtained from the mats with relatively little waste. Nevertheless, the requirements demanded by users as regards the quality of the labelled or printed formed articles are very stringent, among other things because of the sales-promoting effect of perfectly labelled and/or printed trays or cups in the packaging of foodstuffs.

Essentially, the labelling operation comprises fastening the abovementioned slip or paper insert in the correct location and position, for example on the bottom of a plastic tray, by means of gluing. Hitherto, however, labelling has had to be carried out by hand on the finished, that is to say separated formed articles, because the machines provided up to now for this purpose, which receive the stamped-out formed articles in stacking shafts and separate, label and finally restack them, do not ensure sufficient quality and in view of the fact that this involves too high an outlay. Sufficient qualities are achieved in the manual work, but even here the work is carried out on the stamped-out, that is to say separated formed articles which come from the packaged or bagged units. A precondition of the labelling usually carried out by female labor is that the formed articles must be unpacked and removed from the stack before the adhesive coating can be applied and the label printed on the correct side. The formed articles labelled in this way are stacked once more and packaged again before they are finally used by the consumer.

The labelling capacity obtainable in this way is too low in relation to the high production speeds at which the formed articles are produced and also in view of the later packaging speeds which are likewise frequently achieved by means of special machines. Since it is extremely difficult to stack, unstack and label the light-weight and small formed articles after they have been separated, unavoidable losses also occur as a result of damage, and these are of economic importance because of the high production quantities.

What was said above also applies to the process step of printing the formed articles. Where the particular formed articles in question are concerned, it must be remembered that their faces which have to be printed are not smooth, and this makes it impossible to use normal rotary printing machines.

The object of the invention is, therefore, to speed up the labelling and/or printing of the plastic formed articles described and to simplify the processing of the plastic formed articles which is necessary for this purpose.

Because, in the process according to the invention, the labelling and/or printing is carried out during the intermediate cycle, it is possible to operate the production line further at the conventional high productions speeds and obtain the ready-labelled and/or ready-printed plastic formed articles after the stamping operation. The reason for this is, on the one hand, that contrary to previous persuasion, the shrinkage of the shaped formed articles which occurs during the intermediate cycle as a result of heat loss does not disturb the fastening and bonding of the glued-on labels, in any event not when the adhesive is coated over a relatively small area. On the other hand, according to the invention, in the intervals or periods free of movement are utilized to press the labels, together with the adhesive, onto the formed articles. If, instead of being labelled, the formed articles are to be printed, a printing process which is suitable for printing curved surfaces is used. Because the labelling and/or printing steps are incorporated in the production process, a substantial increase in the production speed is obtained.

In a first alternative, the process can be such that, during the intermediate cycle or cycles, the formed articles of a mat which are to be labelled are provided with the adhesive simultaneously in a first interval and the labels are pressed onto their adhesive coating in a subsequent second interval, and in the first interval, during the coating of the adhesive, the labels required in the second interval are picked up and in the second interval, during the gluing of the labels, the adhesive for the labels of the following mat is picked up. This takes place simultaneously over the entire mat and consequently with that number of labels and glue coatings which is sufficient for labelling all the formed articles arranged together in a mat. It is thereby possible, despite high production speeds, to prevent errors such as result from insufficient coating of adhesive or incorrectly oriented labels.

Under conventional conditions, a production line of the basic type described in the introduction executes, for example, 33 cycles per minute. If only one intermediate cycle is provided for labelling, as is possible according to the invention, there is no need to reduce the production speed at which the line has been previously used. The advantage of the process when the articles are labelled is that, in the production of plastic formed articles, the production speed does not fall below that customarily used. This means, however, that there is no need for any further processing for labelling. On the contrary, the production lines operating according to the invention now supply the formed articles ready-labelled. Consequently at the end of the production line these are stacked or bagged for further use in packaging.

So that the production speed can be doubled, a second alternative for the labelling process is disclosed. In this second alternative, during the cycle or intermediate cycles a number of labels corresponding to the number of formed articles constituting a mat is extracted from the first discharge shafts, and at the same time an equal number of labels which have been provided with adhesive on their way to the mat from the second discharge shafts are pressed onto the formed articles. After this a new mat of formed articles has the labels extracted from the first discharge shafts and provided with adhesive glued on it, while labels are once again extracted from the second discharge shafts.

In this process, there is no disturbing interruption because, as in the process according to the first alternative, either the labels are provided with adhesive or glue is applied to the labels in the process. In the process according to the second alternative, the supply of adhesive does not require a special process cycle. While labels are being extracted on one side of the production belt, labels already provided with adhesive are simultaneously being gluded to the formed articles provided for them. When the gluing operation has ended, the labels which were being picked up are moved to the formed articles still without attached labels, while at the same time, new labels are being picked up from the other side of the production belt. This results in a continuous alternation of the operations of picking up labels and of gluing them on. On their way from the pick-up point to the formed articles, the labels are provided with adhesive.

A feature common to both process alternatives is that the coating with adhesive and the supply of labels are applied from above on the formed articles of a mat in the film sheet oriented horizontally.

The film sheet from which the formed articles are obtained has considerable flexibility, and does not offer sufficient resistance for gluing items to them. However, the invention can utilize the dimensional stability which arises as a result of being shaped into cups, trays or similarly formed articles formed in the mats and which has more depth than the initial flat condition of the film sheet, because labelling is carried out after the shaping operation and before the formed articles are stamped out or separated from the sheet. It is, therefore, possible to control the process according to the invention perfectly by means of the feature of supplying the labels and adhesive from above. The advantage of this embodiment of the invention is that it makes it easier to pick up the labels, despite the extremely low weight of the paper cut-outs used as inserts or labels, the labels being provided in a stack. In terms of the machinery used to put the invention into practice, this embodiment also has the advantage that the necessary sub-assembly can be mounted in the hitherto unused free space which is under and next to the mat and above which the mat is located during the intermediate cycle.

When the process according to the invention is put into practice, this effects utilization of a space which hitherto it has not been possible has been used or to use only inadequately, and which in existing production lines is located between the hot-forming device and the stamping or separation machine following the latter. According to the particular production technique adopted, this covers a base area which corresponds to its area of one mat or at most two successive mats and which is limited on the opposite sides by machines. Consequently, when the transverse arrangement of the glue and label supplies are put into practice, there is a considerable advantage in that the magazines for the labels and the device for providing and applying a liquid or sprayable glue can be accommodated next to the packaging line. Thus, these devices do not require any constructional changes in the existing production line. Another advantage of the invention is, therefore, that it can be subsequently incorporated into existing production lines, without the components and subassemblies necessary for this purpose being dependent on the spatial arrangement of the processing machines already in place.

As already indicated above, the process according to the invention is also suitable for printing the formed articles. For this purpose, it is proposed that the formed articles arranged together in a mat be printed by means of a printing process, while at the same time a set of second pads is provided with the printing ink. When these pads are pressed onto still unprinted, formed articles in a subsequent cycle, the first set of pads, having moved aside, is provided with printing ink.

An apparatus for carrying out the process of the first alternative includes a machine stand arranged in front of a stamping machine in the direction of movement of the film, with a drive and a guide for a tool slide. On the tool slide is located a raisable and lowerable boom which carries, on one side, tools for picking up and applying adhesive and, on the other side, tools for picking up and pressing on labels. The slide is movable at intervals from a position in which the glue-coating tools are located behind the stamping machine and the labelling tools are located next to it under a labelling magazine, to a position in which the labelling tools are located behind the stamping machine and the glue-coating tools are located under a glue-supply device, and vice versa. The rising movement of the slide serves to supply glue to the tools and to the formed articles and to extract labels from the label magazine to press the labels onto the glue-coated formed articles, while the movement of the slide into one of its end positions is preceded by a lowering movement. At the same time the glue-coating tools have dabbers with open adhesive outlets in the glue-supply device, for glue-coating, and cause glue to be coated on the formed articles.

An apparatus for carrying out the process of the second alternative involves an arrangement in which a machine stand is arranged in front of a stamping machine in the direction of movement of the film, with a drive and a guide for a tool slide, on which are located two raisable and lowerable booms. The connecting line for the booms lies in a horizontal plane perpendicular to the direction of movement of the film, and carries the two tools for picking up and applying the labels. One tool can be supplied from a label magazine arranged on the left of of the film sheet in the film direction and the other tool can be supplied from a label magazine arranged on the right of the film sheet. Nozzles for discharging adhesive are attached to the label magazines in the direction of the film sheet. The lifting movements of the slide serve to extract the labels from one of the two magazines and at the same time press the glue-coated labels from the other magazine onto the formed articles, while each movement of the slide into one of its end positions is preceded by a lowering movement.

According to a further embodiment, in both process alternatives the labelling tools have suction heads for extracting labels from shafts of a label magazine and for pressing the labels onto the glue coating on the formed articles.

According to a further embodiment, the formed articles with the labels glued on them are delivered to a stamping machine and are stamped out there in such a way that the formed articles are still connected to one another via webs, and finally the formed articles are separated from the composite structure by means of a suction device and deposited on a lowerable table and are transported away from there when a predetermined stack height is reached. At the same time, the suction elements form a matrix corresponding to the matrix of formed articles. They can be moved up and down and perpendicularly to the film direction towards the stacking table which, after each layer of formed articles has been deposited, can be lowered an amount corresponding to the height of one formed article.

At the same time, for example, the stack height is monitored by means of a photocell.

Figure 2:
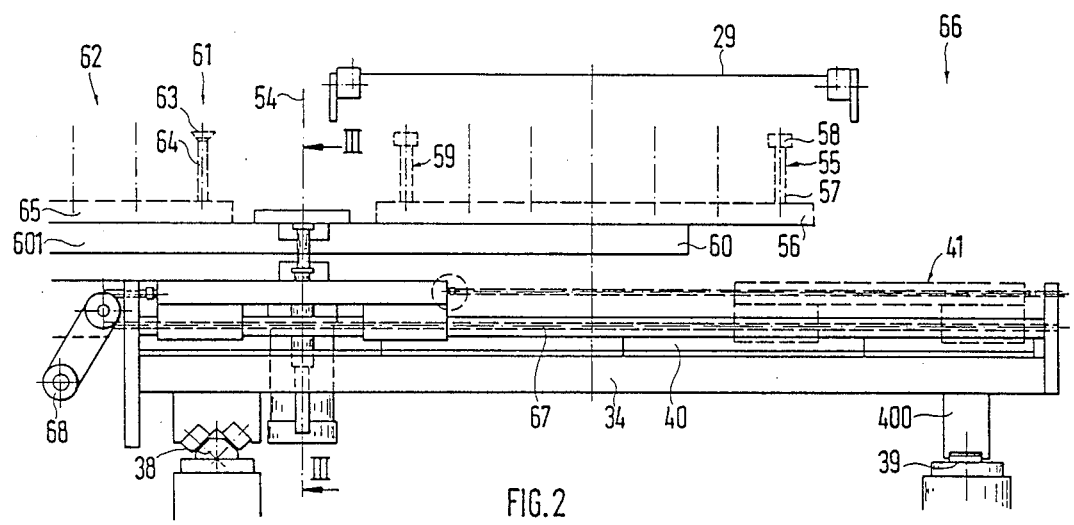
Figure 5:
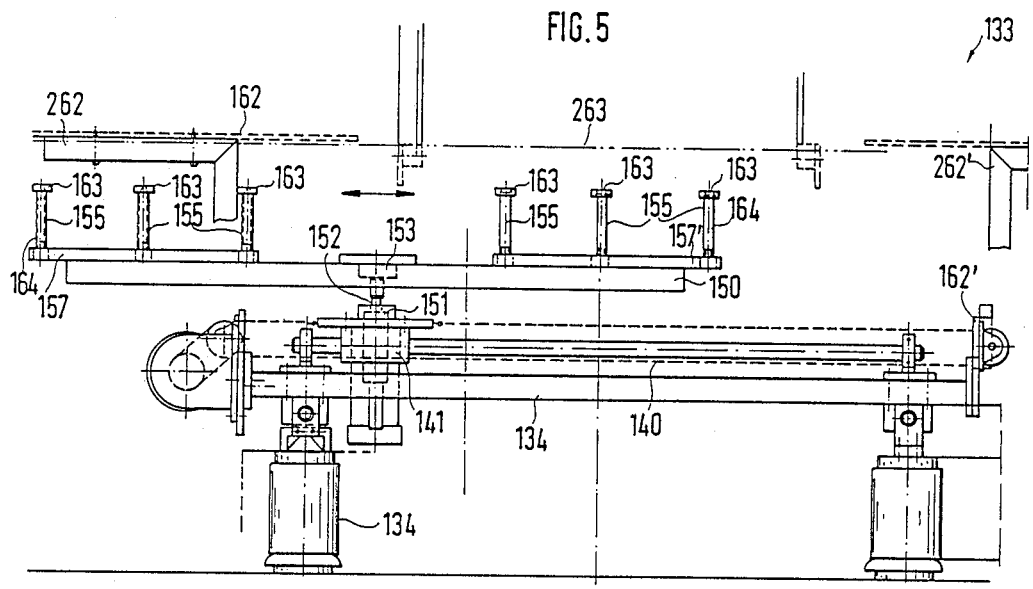
Figure 6:
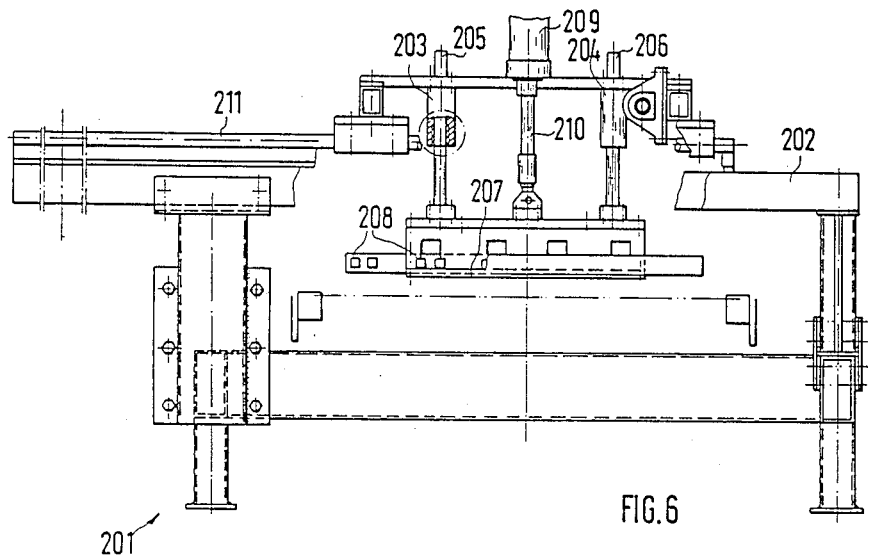

Apparatuses for carrying out the process alternatives according to the invention are described below with reference to exemplary embodiments; in the drawing:

FIG. 1 shows a side view of a stamping machine for separating plastic formed articles and of the apparatus according to the invention (first alternative), FIG. 2 shows a partially schematic end view in the direction of the arrow II of FIG. 1, FIG. 3 shows a section along the line III—III of FIG. 2, FIG. 4 shows a plan view of a formed plastic article and a paper insert with which the formed plastic article is labelled, FIG. 5 shows an end view of an apparatus according to the invention for carrying out the process of the second alternative, and FIG. 6 shows an end view of the formed-article stacking station.

The product to be produced, illustrated in FIG. 4, comprises a tray having an upper plane edge (2) which possesses rounded corners (3 to 6). The outer edge (7) is a cut edge made in a stamping machine which separates the plastic formed article from a mat of which, together with further formed articles, it initially formed an integral part.

The bottom (8) of the formed article (1) has two parallel longer sides (9, 10) and two shorter sides (11, 12) extending essentially at right angles to these. It is plane and connected to the upper edge (2) by means of longitudinal walls (13, 14) diverging upwardly and transverse walls (15, 16). The parts described constitute an integral part of the formed article (1).

A label (17) comprises several layers of paper. Its top side (18) is smooth. The underside is formed by an absorbent paper cut-out (19) which is provided with square depressions (20) and which, therefore, has a surface interrupted by these depressions. The broken line (21) represents the correct position of the label (17), with the paper cut-out (19) facing down, in the tray which is formed by the plastic formed article (1). The dotted line (22) represents the boundary of an adhesive coating. By means of this adhesive, the underside of the label (17) provided with the depressions is connected to the top side of the bottom (8) of the tray.

The illustration in FIG. 1 shows a stamping machine (23), the top part (24) of which is vertically movable relative to the fixed lower part (25). The lower part rests on a machine stand (26, 27) which is arranged on the floor (28) of a shed in a stationary manner, but so as to be displaceable. The lower part (25) forms a table, the top side (29) of which represents the plane (30) of a film, from which ready-shaped and hardened plastic formed articles are stamped. The underside (31) of the film is therefore offset downwards from the top side as indicated by a line representing the plane in which the inner faces of the bottoms (8) of the formed articles (1) are located when the latter are guided through the stamping machine (23) in a fixed cycle in mat form.

The film direction is indicated by the arrow (32). In this direction, the stamping machine (23) is preceded by the apparatus, designated as a whole by (33), for carrying out the process according to the invention in its first alternative. The apparatus stands under a mat which cools during the intermediate cycle of the production line, otherwise not shown, after the articles (1) formed in the mat have been shaped downwardly from the film by means of deep-drawing or a compressed-air technique.

According to the illustration in FIGS. 1 and 2, the apparatus according to the invention has a machine stand (34) formed by a frame (33a) which, by means of two double skids (36, 37) rests on a rail (38) and a guide rail (39) (FIG. 2) with corresponding skids (39'). The rails (38 and 39) extend parallel to the direction movement (32). The machine stand (26, 27) of the stamping machine (23) is likewise movable in the direction of film movement. A coupling (not shown) maintains the machine stand (34) of the apparatus (33) at a predetermined distance from the stamping machine (23). The movability of the stamping machine (23) in the direction of film movement makes it possible, by means of a control, to align the stamping tools exactly with the edges (7) (FIG. 4) of the formed articles (1) in the mat. It must be remembered here, that, when the production line is in operation, the position of the stamping machine (23) required for this has to be varied. This results, on the one hand, from the production of different formed articles (1) on the same production line, and on the other hand also from certain unavoidable dimensional variations which occur as a result of the heat treatment of the film sheet. A corresponding change in the position of the apparatus (33) according to the invention is therefore necessary. By means of the coupling, it is possible, during the operation of the production line, to transfer changes occurring in the position of the stamping machine (23) directly to the apparatus (33) and thus carry out the adjustment of this apparatus by means of the stamping machine (23) because, in the production of specific formed articles (1), the distance between the apparatus (33) and the stamping machine (23) is constant. However, it is also possible to correct the film run by means of a photocell control (not shown), when the stamping machine is fixed in place.

The bed (40) of a tool slide (41) guided in this is accommodated on the machine stand (34). The tool slide has two end positions, of which the one on the right is represented by broken lines and the one on the left by unbroken lines in FIG. 2. Details of the tool slide emerge from the illustration in FIG. 3.

According to this, the machine stand (34) carries two rails (42, 43) which extend transversely relative to the direction of film movement and the rounded heads of which form a positive guide for skids (44, 45) of the slide. Fastened on the slide are guide bushes (46, 47) for guide rods (48, 49) which guide a boom (50) in a raising and lowering movement. This movement is produced by a hydraulic or pneumatic cylinder (51) via its piston rod (52) and a connection (53) to the underside of the boom (50).

The center of the boom corresponds to the sectional plane of FIG. 3 and is designated by (54) in FIG. 2. On one side, the boom carries a plurality of glue-coating tools (55) on a crossmember (56). Such a glue-coating tool has, on a stem (57), a dabber (58) by means of which an adhesive coating can be applied according to the contour line (22) represented in FIG. 4. The illustration in FIG. 2 shows two glue-coating tools (55, 59) of the type described. The remaining five identical glue-coating tools are merely indicated by their center lines.

While the tool carrier (56) is arranged on one arm (60) of the boom (50), the other arm (60) of the boom (50) carries the same number of labelling tools (61) as glue-coating tools (58, 59). Such a labelling tool comprises a suction head (63), by means of which a vacuum can be applied to a label which is located in a shaft of a magazine arranged on the side (62), but which is not shown. This suction head (63) sits on a stem (64), through which the vacuum is applied and which is itself accommodated on a carrier (65) supported by the arm (60).

Also not shown in FIG. 2 is an adhesive supply vessel installed in a stationary manner at (66). This has a number of extraction points corresponding to the number of glue-coating tools (55, 59), and these extraction points can be opened by means of their dabbers (58) and an appropriate quantity of adhesive then released.

The apparatus described above operates as follows: from the film sheet drawn off from a roll, in front of the apparatus (33) formed articles (1) are produced in the deep-drawing machine (not shown) after appropriate heating in mat form. The mat has seven formed articles in the transverse direction, and in the longitudinal direction several rows each of seven formed articles can be provided in the mat. However, that is unimportant for the below-described mode of operation of the machine and is therefore not discussed in detail.

The production line operates by fixed cycles. It has an intermediate cycle, in which a mat is located in the correct position above the apparatus (33), while the previously formed mat is located in the stamping machine (23). During the intermediate cycle, labelling is carried out in the following way: first, the slide (41) moves in the bed (40) into the position represented by unbroken lines in FIG. 2. During the standstill of the mat, the boom (50) is lifted by means of the cylinder (51), as a result of which the dabbers (58), previously provided with glue, of the tools (55, 59) apply the glue coatings evident from the figure onto each formed article (1) of the mat. This is carried out during a first interval. In this interval, after the upward movement of the boom (50), the suction heads (63) of the labelling tools (61) extract a label (17) from the shafts of the labelling magazine at (62). At the end of the interval, the piston rod is retracted, so that the dabbers (58, 59) are released from the formed articles (1). In the following interval, the tool slide (41) is shifted by means of two parallel roller chains (67) via a drive (68), out of the left-hand position of FIG. 2, represented by unbroken lines, into the position represented by broken lines. The labels located on the suction heads (63) thereby assume the correct position under the formed articles (1). When the piston rod (52) is extended from the cylinder (51), the boom (50) is consequently raised until the suction heads (63) press the labels on their correct side against the bottoms of the formed articles (1), that is to say against the glue coating located there. At the same time, the dabbers (58, 59) are brought under the outlets of the glue-supply device, to be imagined as being at (66), and are provided with glue. The boom (50) is then lowered again, so that the suction heads (63) release the labels which are adhered to the bottoms of the formed articles (1).

At the same time, the intermediate cycle ends, and in the following cycle the mat enters the stamping machine (23) where the formed articles (1) are cut out, thereby separated and thereafter counted and bagged.

In contrast to the example of the embodiment illustrated, each of the two intervals described can correspond to an intermediate cycle, but this is not provided in the present exemplary embodiment.

FIG. 5 illustrates an apparatus (133) for carrying out the process according to the second alternative. This apparatus (133) also possesses a machine stand (134) which corresponds essentially to that known from FIG. 2 and which is therefore not described in more detail. The bed (140) of a tool slide (141) guided in this is accommodated in the machine stand (134). The tool slide (141) has two end positions, of which the one on the left is shown in FIG. 5. Details of the tool slide are essentially identical to those appearing in FIG. 3. Guide rods which, however, are not shown in FIG. 5 are also fastened to the slide (141) and guide a boom (150) in a raising and lowering movement. This movement is produced by a hydraulic/pneumatic cylinder (151) via its piston rod (152) and a connection (153) to the underside of the boom (150). On each of the two sides of the boom (150), a plurality of labelling tools (155) are arranged on a cross-member (157, 157'). These labelling tools (155) each comprise a suction head (163), by means of which a vacuum can be applied to a label which is located in a shaft of magazines indicated at (162 and 162'). The suction head (163) sits on a stem (164), through which the vacuum is applied and which is itself accommodated on the carrier (157, 157') supported by the arm (160). The magazines (162, 162') merely represented by broken lines are each fastened on a frame (262, 262'). Arranged on this frame (262, 262') are nozzles (not shown), which spray adhesive onto the labels sucked up from the magazines (162, 162'), during the time when they are moved by means of the tool slide (141) into the film plane indicated at (263).

The apparatus described above operates as follows: from the film sheet drawn off from a roll, in front of the apparatus (133) formed articles (1) are produced in the deep-drawing machine (not shown) after appropriate heating in mat form. The production line operates by fixed cycles. It has an intermediate cycle, in which a mat is in the correct position above the apparatus (133), while the previously formed mat is located in the stamping machine (23). During the intermediate cycle, labelling is carried out in the following way: first, the slide (141) moves into the position shown in FIG. 5. During the standstill of the mat, the boom (150) is raised by means of the cylinder (151), as a result of which the labelling tools (155) arranged on the left of the boom (150) come under the shafts of the labelling magazine (162). The suction heads (163) extract the necessary labels from the magazine (162). At the same time, the labelling tools (155) arranged on the right on the boom (150) press labels, extracted from the magazine (162') and which on the way have been sprayed with adhesive, onto the formed articles of the mat provided. The piston rod (152) is then retracted into the cylinder (151). At the same time, the labelled mat is moved into the stamping machine (23). The tool slide (141) is moved into the opposite position, so that the labelling tools (155) arranged on the right of the boom (150) are located under the shafts of the labelling magazine (162'). The piston rod (152) then moves upwardly. New labels for the following mat are now sucked up from the magazine (162'), while the labelling tools (155) arranged of the left on the boom (150) press the labels, previously sucked up from the magazine (162) and which on the way likewise have been sprayed with adhesive, onto the formed articles of the mat provided. The labelled mat is then moved into the stamping machine (23). In this way, the production speed is doubled in comparison with the process according to alternative 1, since a new mat assumes the position of readiness during each lowering movement of the boom (150).

In the stamping machine (23), the formed articles are stamped out from the mat, but there remain webs which preserve the composite structure of the formed articles. In this state, the mat is transported further and passes into the stacking station (201) shown in FIG. 6. This essentially comprises a stand (202) which is built in the manner of a bridge over the film sheet and on which are arranged vertically above the film plane guide bushes (203 and 204), in which run guide rods (205 and 206) engaging on a frame (207) containing a matrix of suction heads (208) which corresponds to the arrangement and number of the formed articles contained in the mat. The frame (207) can be moved in the vertically by means of a pressure-medium cylinder (209), the piston rod (210) of which is fastened to the frame (207). The cylinder (209) together with the frame (207) is movable perpendicularly to the film direction on rails (211). The rails (211) project laterally beyond the stand (202), so that the frame (207) can be moved vertically over a lifting table arranged next to the stand (202). The lifting table is not shown. However, it is designed so that, after the formed articles have been deposited on it each time, it is lowered an amount corresponding to the thickness of a formed article. At the same time, a photocell can check that the deposit level remains constant. According to a set stack height, a counting device or a comparable arrangement generates a pulse which, for example, sets in motion a conveyor belt which forms the surface of the lifting table and which transports the stack away. However, before the formed articles arrive at the lifting table, they are sucked up by the suction heads (208) and separated from the composite mat structure. The frame (207) is moved upwards by means of the retracting piston rod (210) of the cylinder (209). The cylinder (209) and the frame (207) are then moved into position above the lifting table. There, the formed articles are released from the suction heads (208) and pass onto the surface of the lifting table. The cylinder (209) together with the frame (207) is then once more moved over the next mat.

I claim:

1. A process for producing formed labelled three dimensional plastic articles from a sheet of heated plastic film including the steps of providing at a first station a first sheet of the heated plastic film, shaping said sheet into a plurality of interconnected three dimensional articles, cooling the so formed sheet, at a second station providing an adhesive applicator and a label applicator, moving both of said applicators simultaneously, alternately aligning said applicators with said sheet and while said adhesive applicator is aligned with the sheet simultaneously applying adhesive to all of the shaped articles and simultaneously causing the label applicator to obtain a plurality of labels equal in number that of the articles, moving both of said applicators to align the label bearing applicator with the articles to which the adhesive has been applied and aligning the adhesive applicator with a source of adhesive, moving said label and adhesive applicators simultaneously to apply the labels and receive a new charge of adhesive.

2. The process for producing formed three dimensional plastic articles described in claim 1 wherein the plastic sheet is offset downwardly to form the articles and said applicators move upwardly to apply the adhesive and labels to the articles.

3. The process for producing formed labelled three dimensional plastic articles described in claim 1 wherein said sheet is moved intermittently as a continuous ribbon extending through said first and second stations.

4. The process for producing formed three dimensional plastic articles described in claim 1 wherein a separator station is provided, at said separator station first severing the sheet around each article while retaining sufficient connection between each article and the sheet to transport the sheet and articles as a unit, then aligning the sheet and connected articles to a source of vacuum and applying the vacuum to each of the individual articles to separate them from the sheet.

5. The process for producing formed three dimensional plastic articles described in claim 1 wherein said sheet is moved in a straight path through said first and second stations and said applicators are moved at a right angle to said path.

6. The process for producing formed three dimensional plastic articles described in claim 5 wherein said applicators are moved upwardly both when obtaining adhesive and labels and when applying them to the shaped articles.

7. A process for producing formed and labelled three dimensional plastic articles including the steps of providing a sheet of plastic film which sheet has been shaped into a plurality of interconnected three dimensional articles arranged as a group, providing adhesive applicators and label applicators, each arranged in groups corresponding to the group of articles, moving both of said groups of applicators simultaneously, aligning said adhesive applicators with said sheet and while said adhesive applicator is aligned with the sheet simultaneously applying adhesive to all of the shaped articles the further steps of providing the sheet as a continuous ribbon, moving the sheet intermittently to align each group of articles with the applicators.

9. The process for producing formed and labelled three dimensional articles described in claim 7 wherein the applicators are moved vertically.

10. The process for producing formed and labelled three dimensional articles described in claim 9 wherein the adhesive applicators are charged with adhesive at the top of one upward movement and the label applicators apply their labels at the top of the same upward movement.

11. The process for producing formed and labelled three dimensional articles described in claim 10 wherein the adhesive applicators apply the adhesive to the articles at the top of an alternate upward movement and the